US006601417B2

(12) United States Patent
Cowper

(10) Patent No.: US 6,601,417 B2
(45) Date of Patent: Aug. 5, 2003

(54) LOCK

(75) Inventor: Brian Edward Cowper, Surrey (GB)

(73) Assignee: Banham Patent Locks Limited, London (GB)

( * ) Notice: Subject to any disclaimer, the term of this patent is extended or adjusted under 35 U.S.C. 154(b) by 0 days.

(21) Appl. No.: 10/009,662

(22) PCT Filed: Feb. 22, 2001

(86) PCT No.: PCT/GB01/00731

§ 371 (c)(1), (2), (4) Date: Nov. 9, 2001

(87) PCT Pub. No.: WO01/69017

PCT Pub. Date: Sep. 20, 2001

(65) Prior Publication Data

US 2002/0157432 A1 Oct. 31, 2002

(30) Foreign Application Priority Data

Mar. 11, 2000 (GB) ............................................ 0005755

(51) Int. Cl.[7] ........................... E05B 65/06; E05B 9/08; E05B 33/00; F16B 41/00

(52) U.S. Cl. ............................. 70/129; 70/451; 70/367; 70/371; 70/232; 70/DIG. 57

(58) Field of Search .......................... 70/367, 371, 451, 70/DIG. 57, 232, 129

(56) References Cited

U.S. PATENT DOCUMENTS 1,420,760 A * 6/1922 Schoell ........................ 70/116
1,512,939 A 10/1924 Ledin
2,198,079 A * 4/1940 Ferris et al. ................ 292/143
3,550,412 A * 12/1970 Pitel et al. ..................... 70/461
3,580,017 A 5/1971 Waldo ........................... 70/81
4,196,602 A * 4/1980 Akselsen ...................... 70/211
4,401,247 A * 8/1983 Zoor .......................... 224/315
4,724,690 A * 2/1988 Dunphy et al. ............... 70/129
4,782,675 A * 11/1988 Thorburn ...................... 70/129
4,792,167 A * 12/1988 King et al. ................. 292/179
4,813,250 A * 3/1989 Yeh ............................. 70/104
6,139,075 A * 10/2000 Daoud ........................ 292/281

FOREIGN PATENT DOCUMENTS

DE 85 26 324 U 1/1987

* cited by examiner

*Primary Examiner*—Anthony Knight
*Assistant Examiner*—Michael J. Kyle
(74) *Attorney, Agent, or Firm*—Wells St. John P.S.

(57) ABSTRACT

A lock for a door (10) comprising a casing (11), a bolt (55) operable to extend from or retract into the casing, a pivoted operating handle (36) operable at one side of the door movable from a rest position to an operating position to retract the bolt, the interior of the casing having a lug (21) through which a screw (27) passes into engagement in a tapped hole (23) in a fixing plate (12*a*) which is secured to said one side of the door, thereby indirectly securing the casing to the door. A screwdriver blade (27*a*) can be inserted through an opening (34, 35) in the casing to access the screw (27) when the handle is in its operating position, such access being prevented when the handle is in its rest position, by said handle blocking said opening, the handle being lockable in its rest position from said one side of the wing.

7 Claims, 8 Drawing Sheets

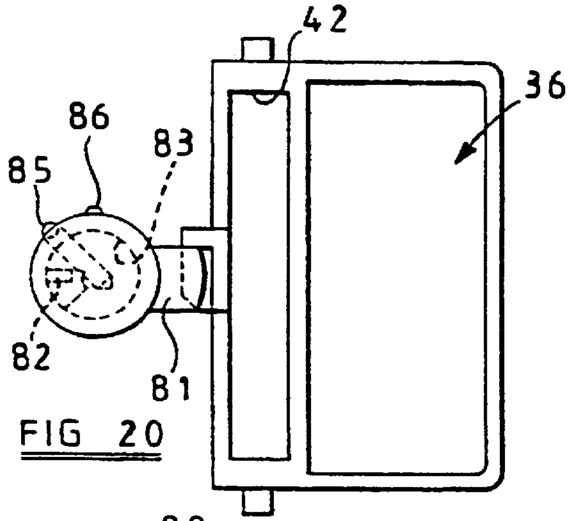
FIG 20
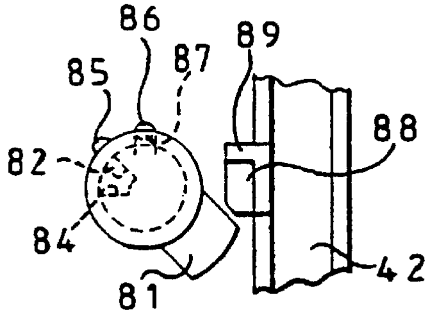
FIG 21
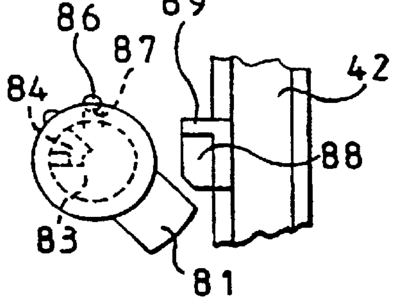
FIG 22
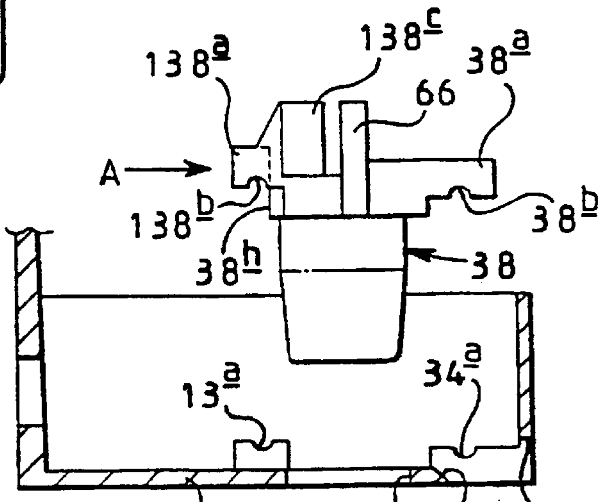
FIG 24
FIG 23
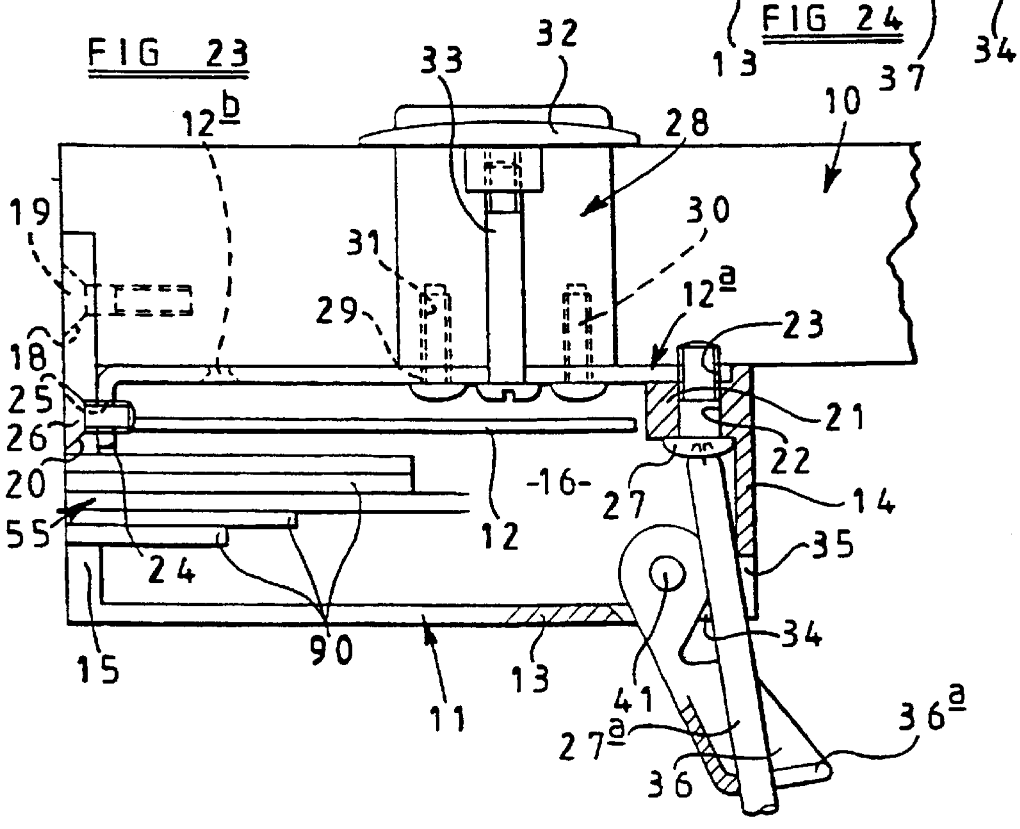

LOCK

CROSS REFERENCE TO RELATED APPLICATION

This application is a 35 U.S.C. §371 of PCT International Application Number PCT/GB01/00731, which was filed Feb. 22, 2001, and was published in English.

This invention relates to a lock for a movable wing, and particularly to a lock intended to be rim fitted to a domestic entrance door.

An object of the invention is to provide such a lock in an improved form.

According to the invention a lock for a wing movable between respective open and closed positions relative to a frame comprises a casing, a bolt operable to extend from or to retract into said casing, an operating member arranged to be operable at one side of the wing, in use, from a rest position to an operated position normally to effect retraction of said bolt, the casing having an interior portion with an aperture therethrough to receive fixing means for securing said casing to said wing, in use, access for an implement to fasten or release said fixing means being through an opening in said casing, which opening is blocked by said operating member, thereby to prevent such access, when said operating member is in its rest position.

Preferably the operating member is biased to its rest position. Desirably said operating member has a cutout in part thereof so that when said operating member is in its operated position, part of said implement can be received through the cut-out to access said fixing means. Conveniently the operating member is lockable in its rest position to prevent such access. Advantageously said fixing means extend, in use, through a cover which closes an open side of the casing and is itself, in use, secured to said wing. Most preferably the fixing means is a screw engaged in a tapped hole in said cover.

Figure 1:
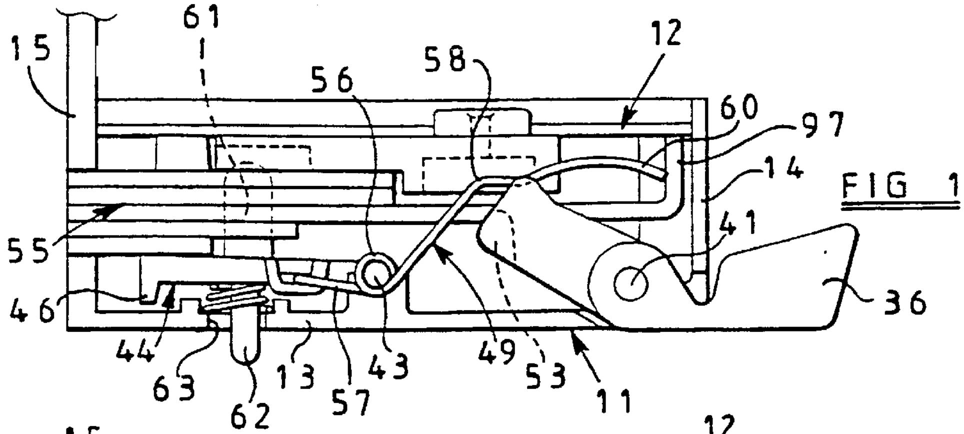
Figure 2:
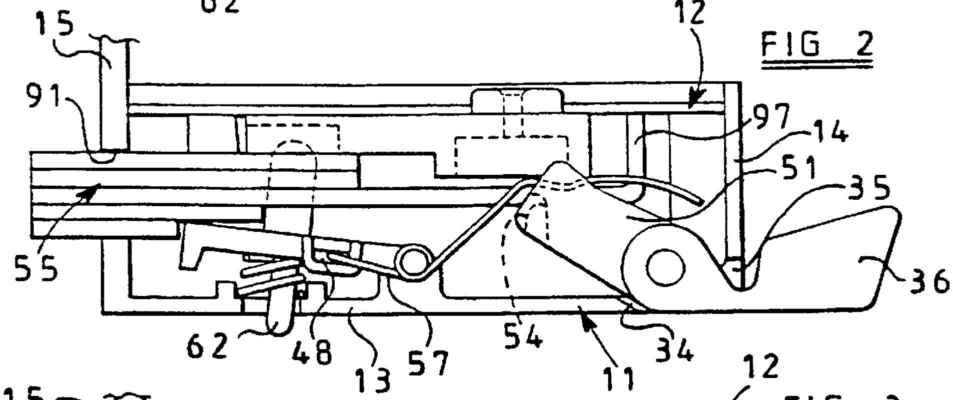
Figure 3:
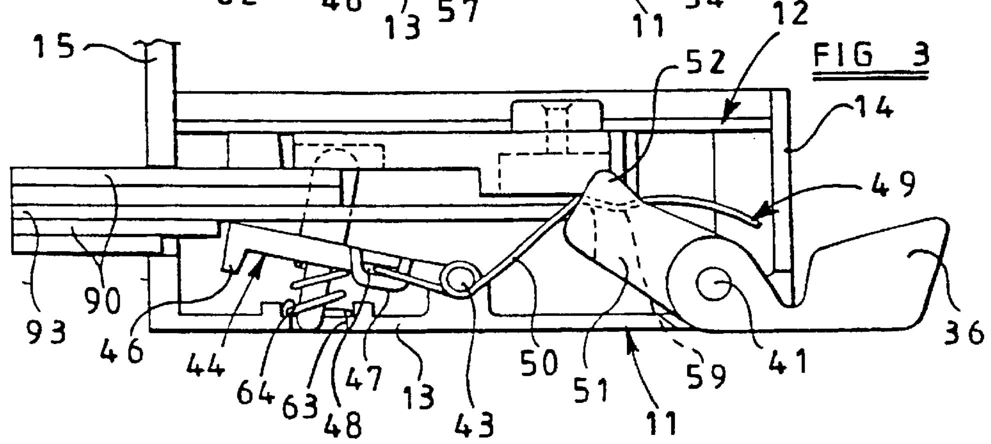
Figure 4:
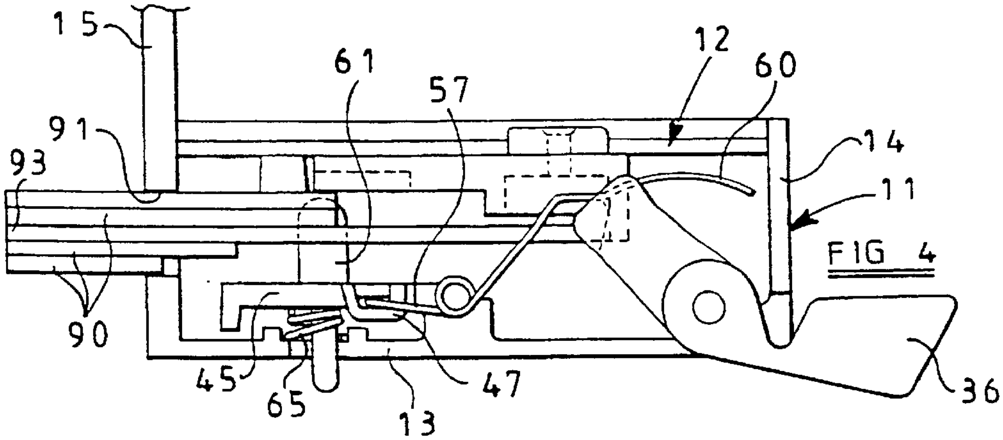
Figure 5:
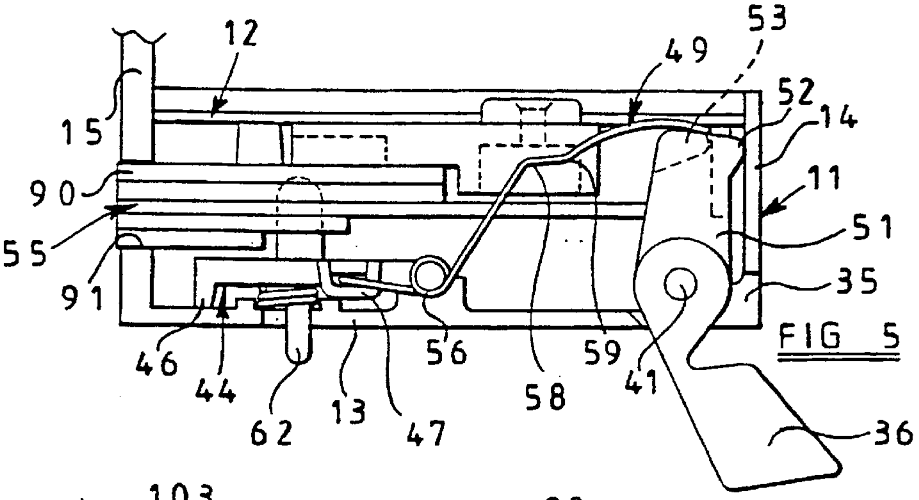
Figure 6:
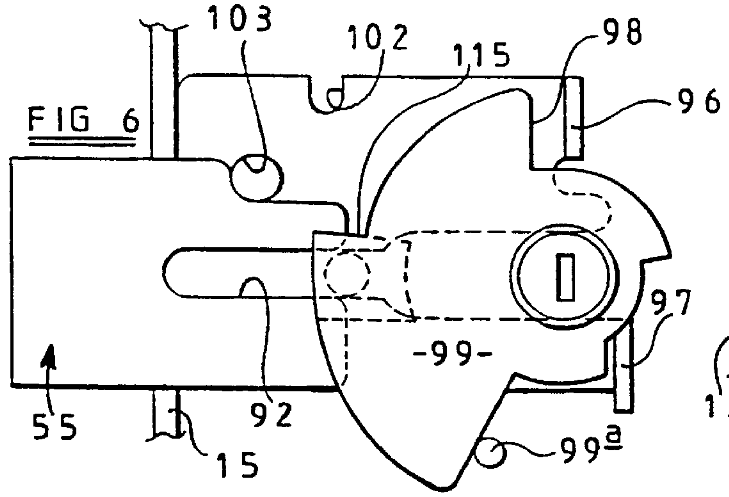
Figure 7:
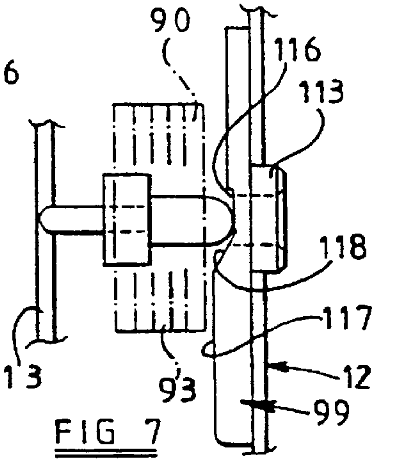
Figure 8:
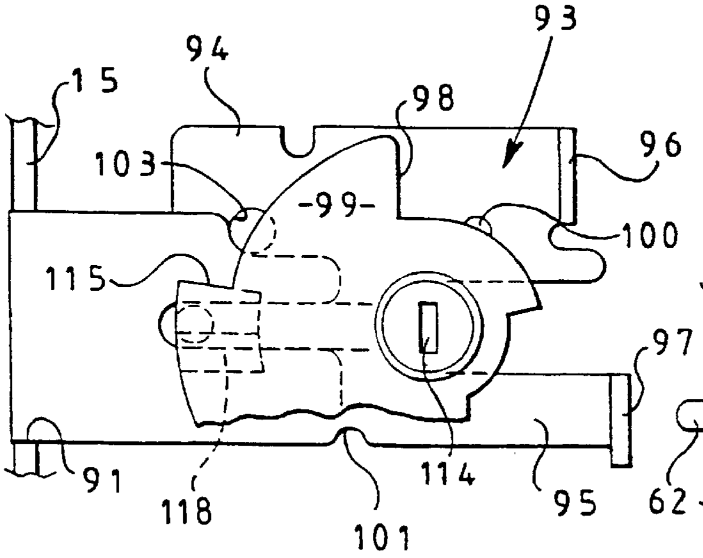
Figure 9:
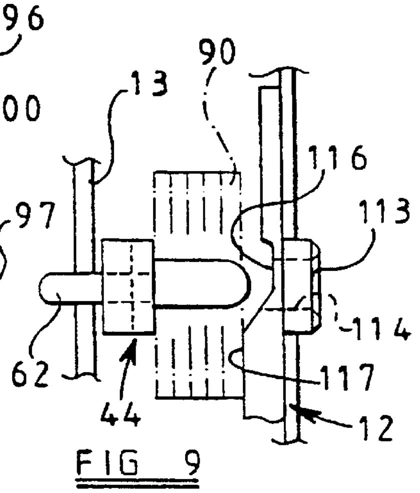
Figure 10:
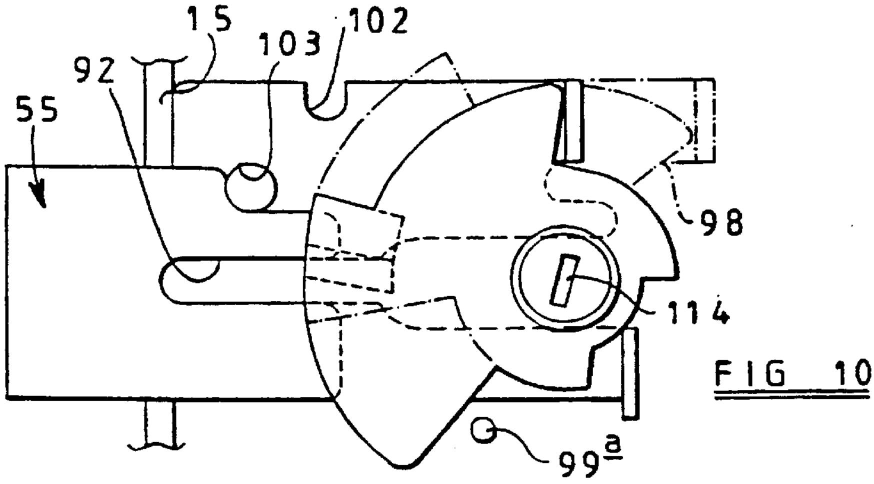
Figure 11:
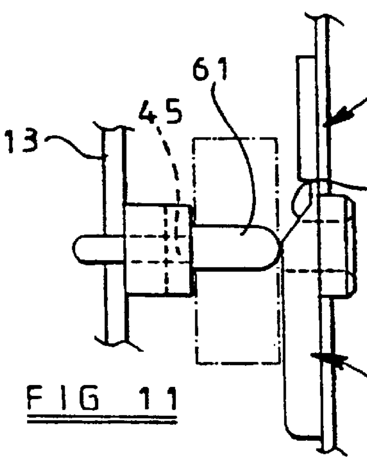
Figure 12:
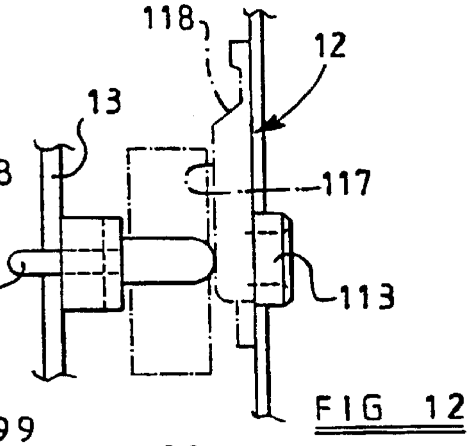
Figure 13:
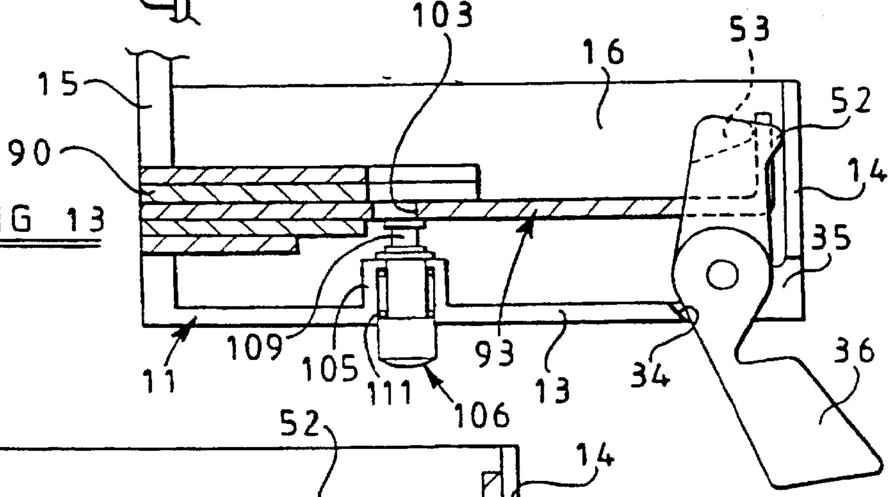
Figure 14:
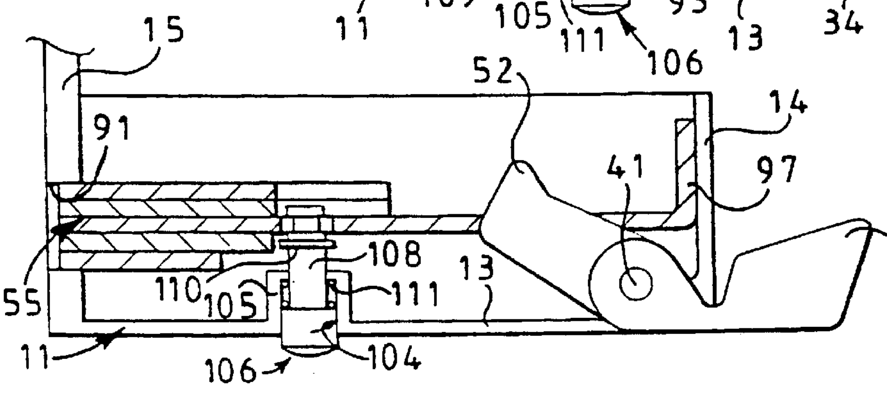
Figure 15:
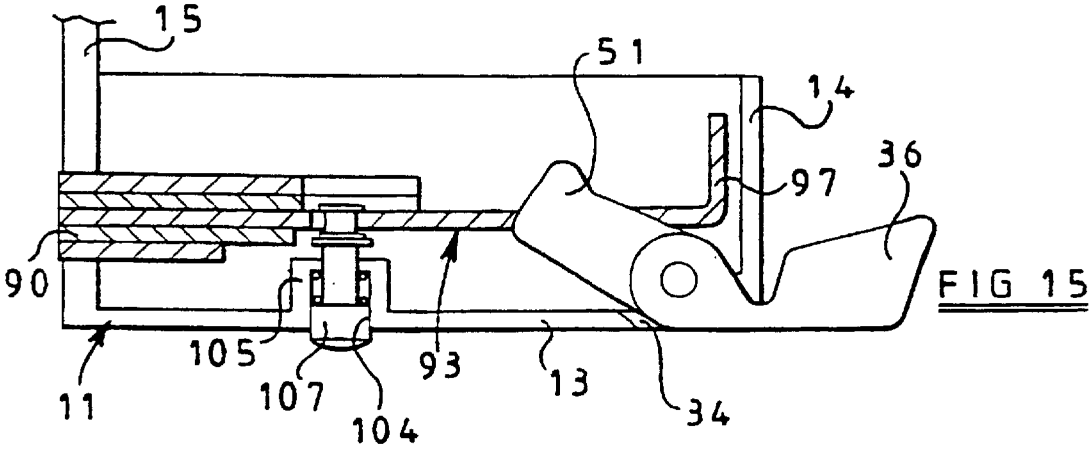
Figure 16:
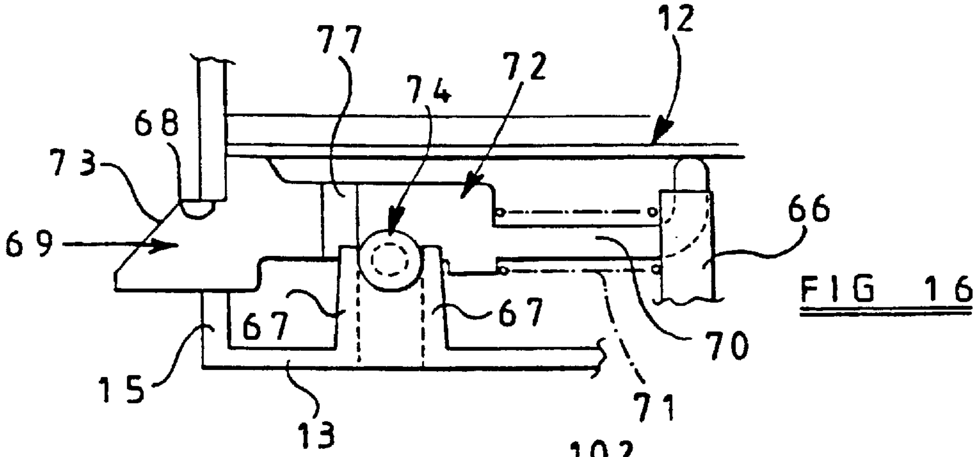
Figure 17:
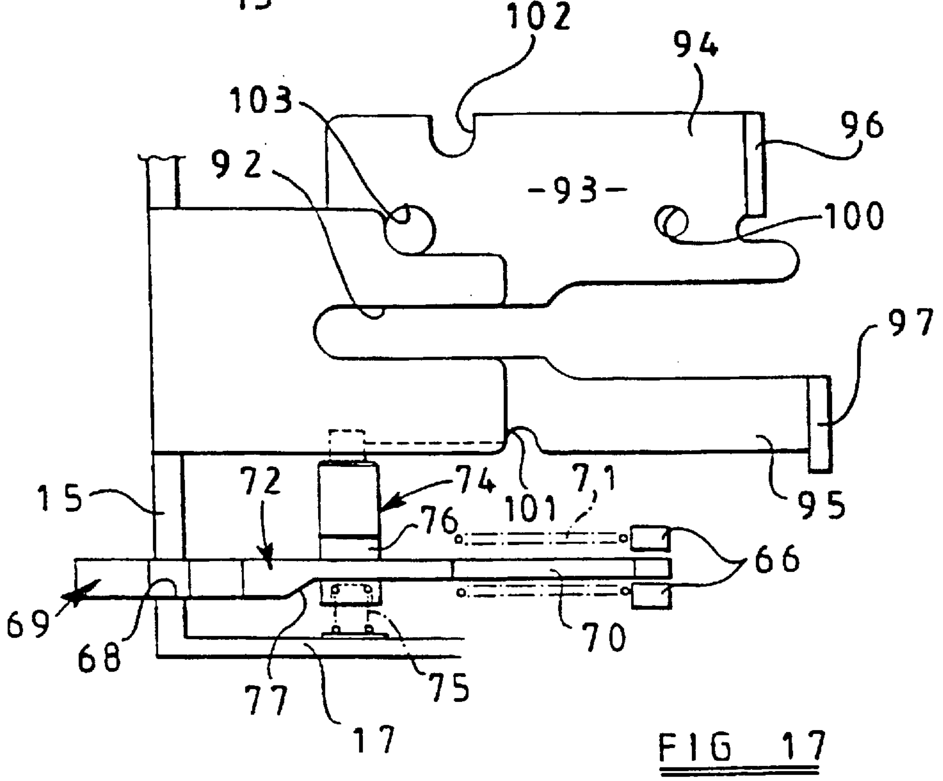
Figure 18:
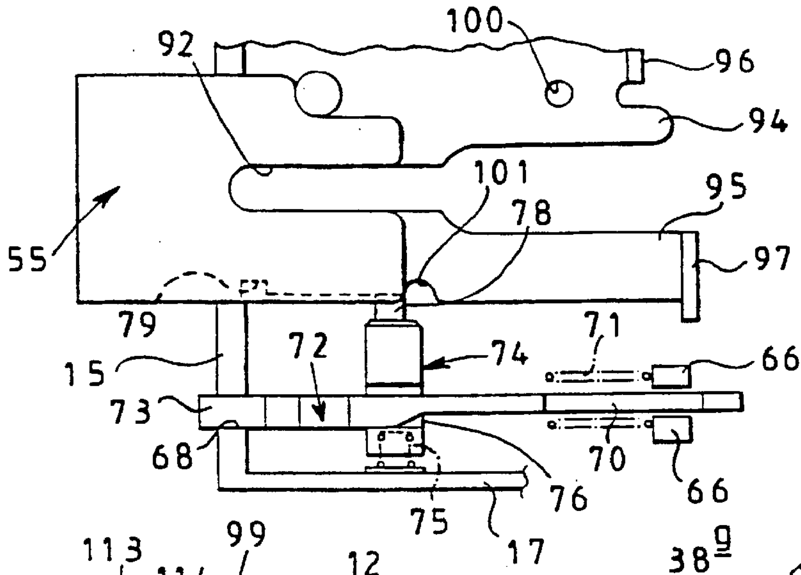
Figure 19A:
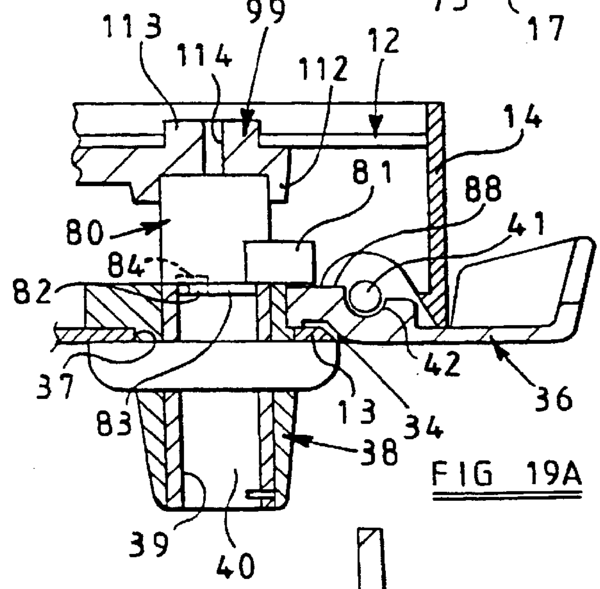
Figure 19B:
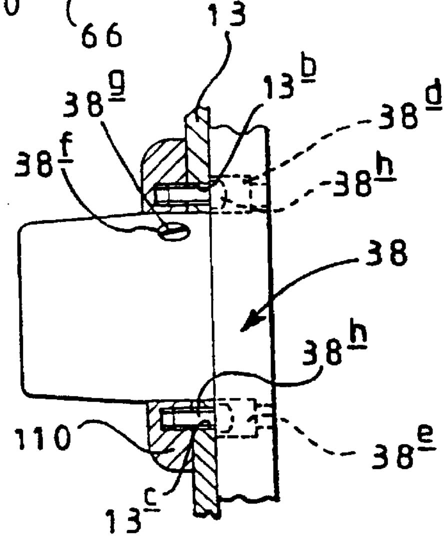
Figure 19C:
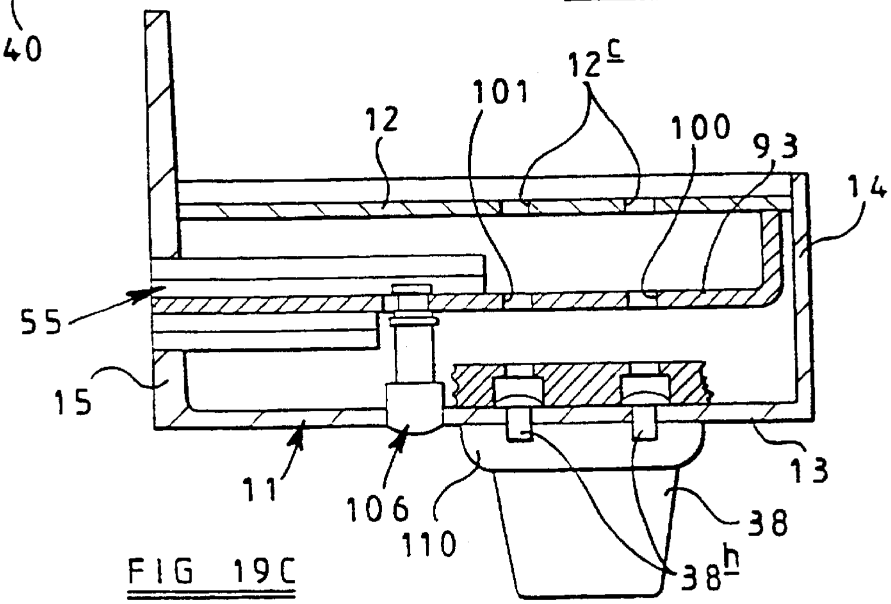
Figure 25:
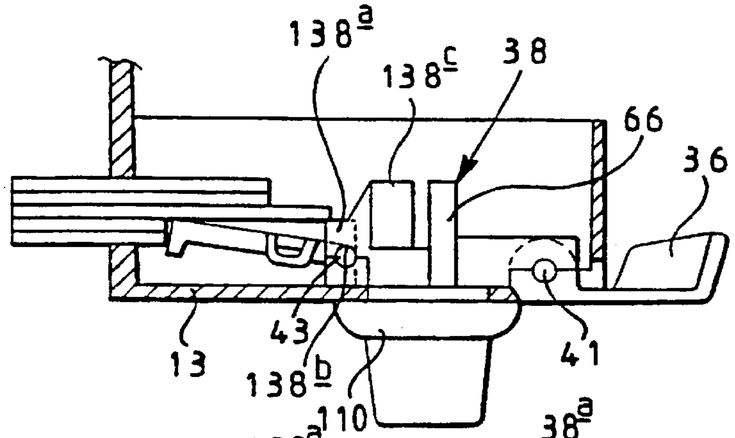
Figure 26:
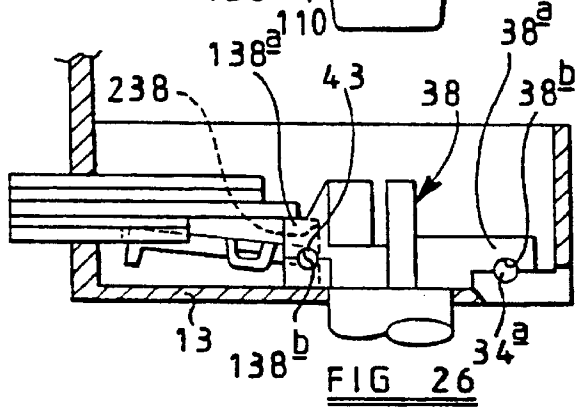
Figure 27:
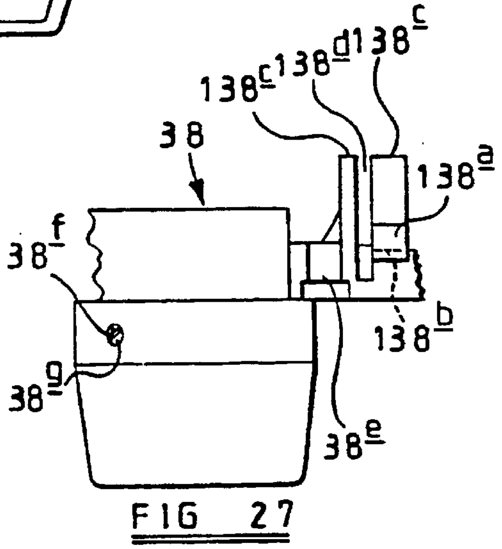
Figure 28:
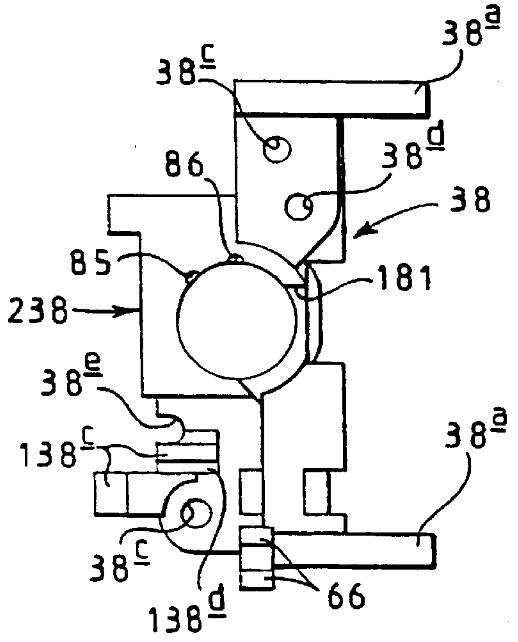
Figure 29:
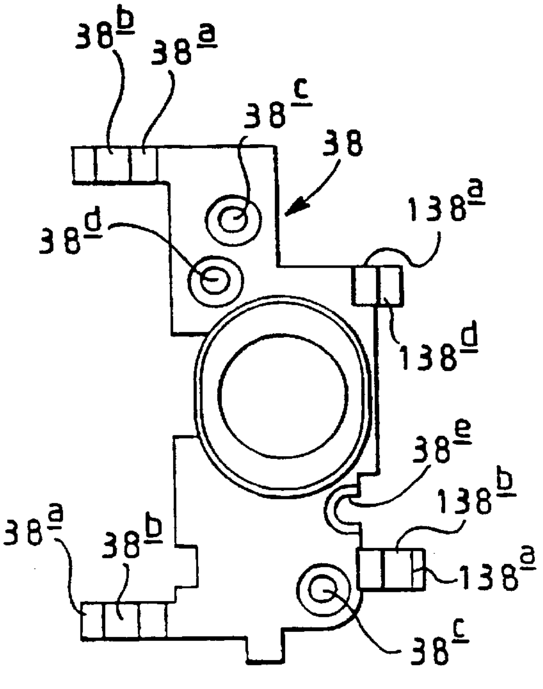
Figure 30:
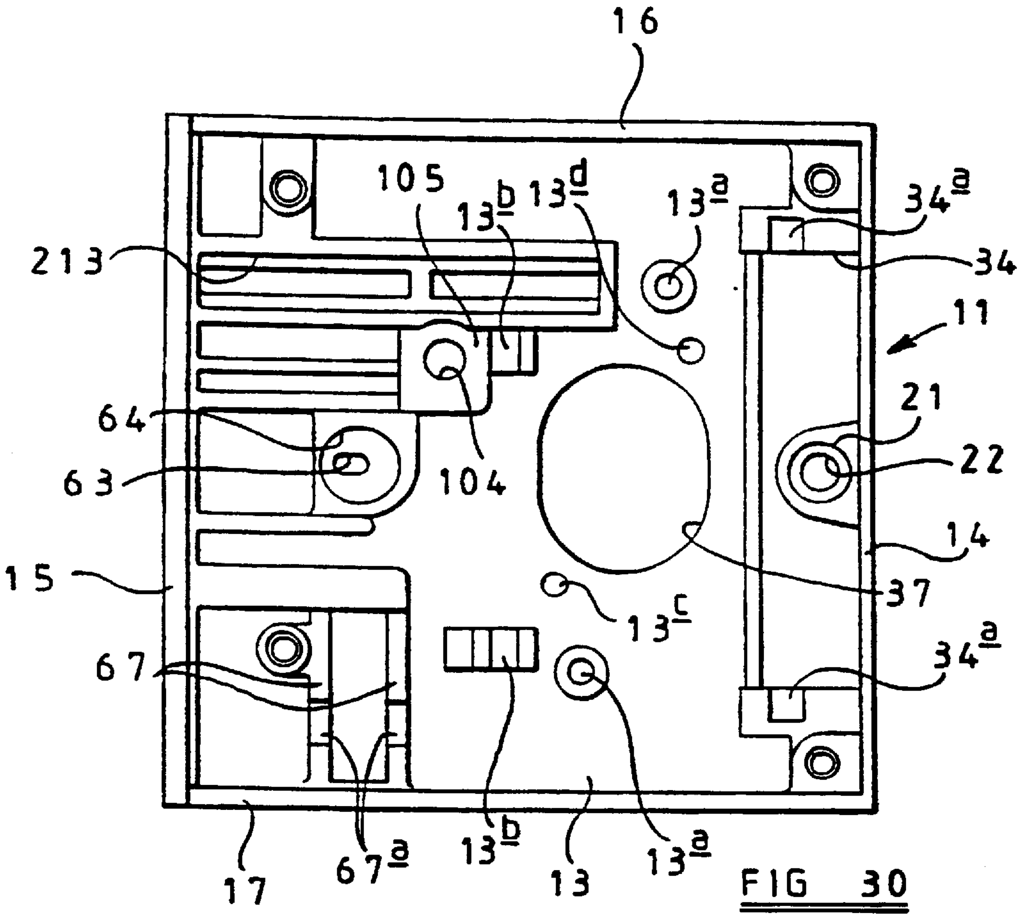
Figure 31:
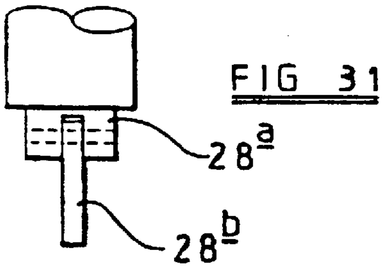
Figure 32A:
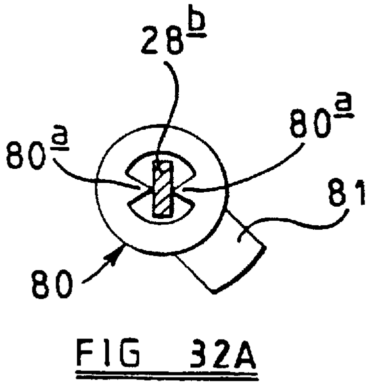
Figure 32B:
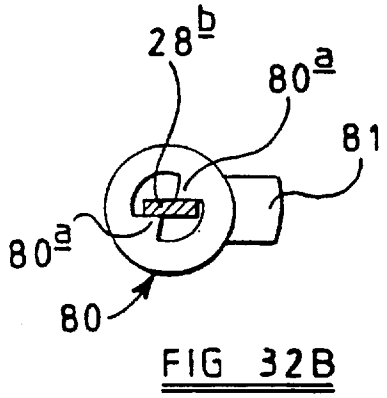

The invention will now be described, by way of example, with reference to the accompanying drawings, in which:

FIG. 1 is a schematic internal side view of a casing of a lock of the invention, with a bolt thereof in its normally retracted state and a handle in its rest position, FIGS. 2 and 3 are respective views similar to FIG. 1, showing the bolt partly and fully extended from the lock casing, FIG. 4 is a view corresponding to FIG. 3, but with the handle partly pivoted from its rest position, FIG. 5 is a view corresponding to FIG. 4, with the handle fully pivoted and the bolt in its normally retracted state, FIG. 6 is a schematic fragmentary, internal plan view of the lock casing, with the bolt in its fully extended, deadlocked state, FIG. 7 is a schematic fragmentary, internal view at 90° to FIG. 6, FIGS. 8 and 9 are views corresponding to FIGS. 6 and 7 respectively, but with the bolt in its normally retracted state, FIG. 10 is a view corresponding to FIGS. 6 and 8 showing a cam member in two alternative positions at the commencement and end of bolt retraction respectively by said cam member, FIGS. 11 and 12 are views corresponding respectively to the two views of FIG. 10, FIG. 13 is a simplified schematic internal side view of the lock casing showing a snib for locking the bolt in its retracted position, the bolt being shown in its normally retracted state prior to actuation of said snib, FIG. 14 is a view corresponding to FIG. 13, but with the bolt retracted further into the casing and the snib actuated, FIG. 15 is a view corresponding to FIGS. 13 and 14, with the bolt in its normally retracted state and the snib actuated to lock the bolt, FIG. 16 is a fragmentary, schematic internal simplified, side view of the casing showing a spring loaded catch and associated bolt retention element, FIG. 17 is a fragmentary plan view corresponding to FIG. 16, with the bolt retention element retaining the bolt in its normally retracted state, FIG. 18 is a view corresponding to FIG. 17, but with the catch depressed to release the bolt retention element to allow the bolt to move to its extended positions FIG. 19A is a schematic, fragmentary side sectional view of the casing showing a key operated lock cylinder arranged at one side of the lock casing having been operated to cause movement of blocking means to a position to prevent operation of the handle to retract the bolt, FIG. 19B is a schematic, fragmentary, split part-sectional view showing how a rose around said lock cylinder of FIG. 19B is secured to said one side of the casing, FIG. 19C is a schematic, split part-sectional view of the lock casing as in FIG. 15, but showing the lock cylinder of FIG. 19C, FIG. 20 is a diagrammatic plan view of the arrangement of FIG. 19A, FIGS. 21 and 22 show positions of the lock cylinder plug relative to the blocking member when the blocking member is moved clear of the handle, before the key turns the plug to the key removal position and after the plug has been turned respectively, FIG. 23 is a simplified internal plan view showing the fixing of the lock casing to one side and front edge surface of a door, FIG. 24 is a schematic reduced scale view similar to FIG. 19, showing a housing which receives the lock cylinder in position to be fitted to the lock casing, FIGS. 25 and 26 are schematic reduced scale views similar to FIGS. 3 and 2 respectively showing bearings for the bolt deadlock element and the handle, the handle not being shown in FIG. 26, FIG. 27 is a scrap view of the housing in the direction of arrow A of FIG. 24, FIGS. 28 and 29 are opposite side views respectively of the housing of FIG. 24, FIG. 30 is an interior plan view of a main body part of the lock casing when empty, FIG. 31 is a scrap side view of part of a locking assembly operable at the outside of the door, and FIGS. 32*a* and 32*b* respectively show a bar of the locking assembly of FIG. 31 engaged with the blocking member of FIGS. 19 to 22 in two positions.

Shown in the Figures is a lock of the invention, which in the illustrated embodiment is rim mounted, i.e. as shown in FIG. 23, is intended to be mounted at one side and partly at one front edge surface of a wing such as a conventionally hinged door 10 which has an associated frame and staple (not shown) so that the door can be moved between an open position and a closed position in which it is locked by a bolt of the lock, such bolt being described hereinafter.

The lock has a metal casing made up of a main body part 11, in the general form of a square box structure having one side open, and a closure part 12 in the form of a flat square metal plate. The plate has respective holes at or adjacent each of its four corners for fixing screws passing into respective threaded bores in bosses formed with the body part 11, to secure part 12 in place inwards of the plane of the outer free edge surface of the part 11, and to complete the lock casing with the assembled components therein concealed from view.

As mentioned, the main body part 11 is in the form of a square box-structure and FIG. 23 shows a side wall 13 integrally formed with an end wall 14 and a front wall 15 which is extended from the side wall 13 further than the end wall 14 to form a forend of the lock, with the extension part of the wall 15 being secured to a front edge surface of the door 10 as shown in FIG. 23, with the free edge surface of the end wall 14 engaging against the inner side of the door, in use, again as shown in FIG. 23. The main body part 11 is completed by a bottom wall 16, and a parallel top wall 17 shown in FIGS. 17 and 18.

The extended part of the front wall 15 is formed with a spaced pair of countersunk holes adjacent its upper and lower edges respectively, one of which 18, is shown in FIG. 23, these countersunk holes receiving corresponding screws, such as screw 19 shown in FIG. 23, for securing this extension of the front wall 15 in a corresponding depth rebate in the front edge surface of the door 10. In the front wall 15, at a position just inward of the plane defined at the open side of part 11, are a pair of spaced countersunk holes, one of which 20 is shown in FIG. 23. At substantially the same level from the side wall 13 as the countersunk holes 20 is provided on the interior of the end wall 14 an integral lug 21 which has a circular-section hole 22 therethrough, the plate 12 having a cut-out to accommodate the lug 21. The outer surface of the lug is spaced from the outer free edge surface of the body part 11 by the thickness of a flat mounting plate 12*a*. This lug 21 is centrally disposed along the end wall 14, and the plate 12*a* has a tapped hole 23 adjacent one of its edges centrally along the length thereof, so that, as shown in FIG. 23, with the plate 12*a* in place at the 'open' side of the main body part 11, the plate 12*a* can rest on the outer surface of the lug 21, at a position spaced from part 12, so as to lie flush at said 'open' side of the body part 11, with the hole 23 aligned with the hole 22 through the lug. Moreover, at its edge surface opposite to its edge surface adjacent which the hole 23 is provided, there are two integral bent down tags, one of which, 24, is shown in FIG. 23. Each tag extends through a slot in part 12, and has a tapped hole therethrough this being shown as 25 for tag 24. With the plate 12*a* arranged, as described, flush at the outer 'open' side of the body part 11, the holes through the respective tags are aligned with the countersunk holes 20 to receive fixing screws, one of which, 26, is shown in FIG. 23. In use, as shown in FIG. 23, a screw 27, captive in the hole 22 in the lug, has its shank engaged in the aligned tapped hole 23 in the plate 12*a*, with its free end received in a recess in the side surface of the door. Accordingly in this way the completed casing, comprising the main body part 11 and part 12, is secured to the mounting plate 12*a*, and by way of the screws 19 the completed casing is also secured to part of the front edge surface of the door. The fixing of the plate 12*a* to part 11 is particularly convenient as compared to prior art arrangements where the equivalent component is often a complicated pressing with tags, slots and the like for securement to the lock case. The plate 12*a* has two countersunk fixing holes therein, one spaced above the other, for wood screws to fix it to the side of the door. One hole 12*b* is shown in FIG. 23. The fixing of the screw 27 forms the subject of the present invention.

Additionally as shown in FIG. 23, the plate 12*a* has a lock cylinder and plug assembly 28 secured thereto. The assembly is positioned on the plate 12*a* centrally over a circular hole (not shown) in the plate 12*a*, with respective projections from the end of the cylinder at respective opposite sides of said hole in the plate 12*a*, extending into correspondingly shaped openings respectively in the plate 12*a*. To secure the assembly 28 in this located position on the plate 12*a*, the plate has a pair of spaced aligned holes 29 therethrough at opposite sides of the hole in the plate 12*a* at which the assembly is centred, and screws 30 are respectively engaged in the holes 29, with the shanks of said screws extending into respective threaded bores 31 in the cylinder of the assembly 28.

In use, as shown in FIG. 23, the completed casing is secured to the door as shown, with the assembly 28 received in a circular-section opening through the door, the end of the assembly projecting from the other side of the door and having fixed therearound a rose 32 or equivalent member. The rose can have a pair of rearwardly directed bosses, arranged diametrically at the top and bottom of the assembly 28, and received in respective bores in the door, and these bosses can be aligned with respective bolts, one of which is shown in FIG. 23 by the numeral 33, which extend through respective holes in the plate 12*a*, with the shanks of the bolts extending through the thickness of the door 10. In one arrangement the threaded ends of these bolts can be engaged in open threaded ends respectively of the rearwardly extending bosses of the rose 32 so as tightly to secure the rose to the outer surface of the door as shown in FIG. 23. With the arrangement described, therefore, and as shown in FIG. 23, the lock casing is securely secured to one side of the door with its lock cylinder and plug assembly 28 secured through the door and accessible for operation at the opposite side thereof. Schematically shown in FIG. 31 is a plug 28*a* and operating bar 28*b* of assembly 28.

A central edge part of the side wall 13 is provided with a rectangular opening 34 schematically as identified in FIG. 23, and a communicating similar rectangular opening 35 is provided in the adjoining edge part of end wall 14. At opposite ends of the opening 34 the interior surface of side wall 13 is provided with respective concave semi-cylindrical bearing surfaces for pivotally mounting a handle 36 which extends through the openings 34 and 35, as will be described. The bearing surfaces 34*a* are identified in FIGS. 24, 26 and 30.

Disposed centrally in the side wall 13 and spaced a little way inwardly of the inner edge of the opening 34, is an oval bole 37 in which is fitted a housing 38 for a lock cylinder 39 and its associated plug 40 as shown in FIGS. 19 and 25. This housing 38 is in the form of a metal casting, e.g. of zinc based alloy, and also includes a pair of parallel spaced arms 38*a* which have respective concave semi-cylindrical bearing surfaces 38*b* defined therein as shown in FIGS. 24, 26 and 29. The bearing surfaces 38*b* mate with the corresponding bearing surfaces 34*a* to form a pair of spaced full bearings for a pivot rod 41 which is located in a part circular channel 42 (FIGS. 19A, 21, 22 and 23) adjacent an inner edge of the handle 36 so as to allow pivoting of the handle 36 relative to the casing. Respective opposite end portions of the rod 41 pass through respective opposite ends of the handle which close the channel 42, and extend outside of said handle ends into said full bearings respectively. Full pivoting of the handle, as shown in FIGS. 5 and 23, is required to allow access through a cut-out 36*a* in the end of the handle, and through openings 34, 35, for a screwdriver shank 27*a*, to enable it to engage the screw 27 both on assembly of the lock casing to the door, or for removal.

The housing 38 also provides, adjacent said spaced arms thereof, respective fixing holes 38*c* therethrough, these holes being aligned with respective internally threaded bosses 13*a* upstanding from the inner surface of the side wall 13. By the use of fixing screws, the housing 38 is thereby secured to said side wall of the casing. This side wall has two holes 13*c*,13*d* therethrough at respective opposite sides of the part of the housing which extends outwardly from said side wall 13, these holes being on a diameter through the centre of the lock cylinder 39 and its associated plug 40. The part of the housing 38 within the casing is provided with one hole 38*d* aligned with the hole 13*c* in the side wall 13 and also a cut-away 38*e* which is aligned with said other 13*d* of said diametrically aligned holes in the side wall 13. The shanks of respective headed fixing screws 38*h* (FIGS. 19B and 19C) are received through said holes 13*c*,13*d* in the side wall 13, with the heads received in said hole 38*d* and cut-away 38*e* respectively. The respective threaded ends of these fixing screws are threadedly received in blind bores in the inner surface of a rose 110 which is fitted around the part of the housing 38 projecting outwardly of the casing, this rose being pulled by said fixing screws against the outer surface of the side wall 13 so as to conceal from view, and to prevent access to, a grub screw hole 38*f* with associated grub screw 38*g*, extending through the housing 38 at the exterior of the casing, this grub screw engaging in a recess in the outer side of the cylinder 39, thereby to secure the cylinder, with its associated rotatable plug therein, to the housing 38. The respective posi-drive heads of these fixing screws extending through the casing part 11 to secure the rose in place are arranged to be uncovered and easily accessible within the casing part 11 when the assembly of casing part 11 and closure part 12 is removed from the plate 12*a* on the door in use, and with the bolt of the lock held retracted, without having to remove components of the lock from the casing part 11, thereby making cylinder removal and replacement much easier than with known arrangements. The plate 12 has holes 12*c* therein aligned with these fixing screws respectively. Once the casing part 11 is removed from the door, all that is required is an undoing of said uncovered fixing screws, the heads of which move into previously 'empty' parts of hole 38*d* and cut-away 38*e*, to release the rose 110, thereby uncovering the grub screw 38*g*. This is then undone, allowing the cylinder 39 and plug 40 to be changed at the outside of the casing part 11. The grub screw is then retightened, the rose replaced and the fixing screws tightened to secure the rose to the surface of side wall 13. This feature forms the subject of our UK Patent Application No. 0005753.9 from which our co-pending International Patent Application No. 10/009,548 (Our Ref. 37637M) claims priority. On assembly the rose 110 can firstly be secured in place by screws 38*h* and the housing 38 secured in place thereafter.

The structure of the housing 38 within the casing, provides four further functions. Firstly, it has two further spaced arms 138*a* defining respective concave semi-cylindrical bearing surfaces 138*b*, the arms and the bearing surfaces being shown in FIGS. 24 to 29. The arms 138*b* extend away from the end wall 14 and the surfaces 138*b* are directed towards the interior surface of the side wall 13 where said bearing surfaces 138*b* mate with corresponding respective concave semi-cylindrical bearing surfaces 13*b* formed on projections upstanding from the interior surface of the side wall 13. This pair of completed spaced bearings act as a pivoting arrangement for a rod 43 of a deadlock element 44 shown best in FIGS. 1 to 5, FIGS. 7 to 12, and FIGS. 25 and 26.

As shown in these Figures, the deadlock element has a rectangular body part 45 extending away from the rod 43, the part 45 having a downturned nose 46 at its end remote from the rod. At the longer side of the body part 45 facing the top wall 17, the body part has a U-shaped projection 47 which is open upwardly and outwardly. The lower interior surface of the projection 47 is substantially at the level of the underside of the body part 45, but at the location of this projection 47, the side of the body part has its lower portion recessed, as shown at 48, so as to receive, as will be described, a straight end part of a spring-like connecting member 49 which links the handle 36 to said deadlock element 44. A second function provided by the housing 38 is a provision of a pair of upstanding surfaces 138*c* which define between them a guide slot 138*d* for a further part 50 of the spring-like connecting member 49 which extends to co-act with the handle 36. As shown in FIGS. 1 to 5, the handle, at its side adjacent the top wall 17 has an arm 51 extending from said channel 42, this arm defining a nose part 52. At its inner side, spaced slightly downwardly from the top of the nose part 52, as viewed with the orientation of the nose part shown in FIGS. 1 to 3, is a further, smaller nose part 53, the parts 52 and 53 being spaced by a section defining a groove 54. This groove is to receive said further part 50 of the spring-like connecting member 49, as shown in FIGS. 1 to 5, whilst the further nose part 53 is to engage an end of a bolt 55 of the lock, as will be described hereinafter.

As shown in FIGS. 1 to 5, the connecting member 49, which is of spring steel, has a central coiled part 56, which is received on the rod 43 which acts as the pivot for the deadlock element 44. At the end of the coiled part 56 remote from the top wall 17, the member is formed with a straight part 57, lying in a plane parallel to the walls 16 and 17, this having its end turned through 90° to provide the previously mentioned straight part which extends into the recessed portion 48 of the body part 45 of the deadlock element 44 as shown in FIGS. 1 to 5. At the other end of the coiled part 56, the further part 50 extends away from the side wall 13, through the guide slot 138*d*, and into the interior of the casing where it is formed with a concave kink 58 and then a convex kink 59 before terminating in a slightly arcuate end portion 60. This further part 50 of the connecting member 49 lies in a plane parallel to the top wall 17 which is in the same plane as the groove 54. As will be explained further for the lock, in use, it can be seen from FIGS. 1 and 2 that with the bolt in its fully retracted or partly extended position the kink 58 and kink 59 are spaced clear of said groove 54. However, in the fully extended position of the bolt 55 shown in FIG. 3, as the deadlock element 44 pivots into the interior of the casing, the kink 58 moves into said groove. If from this position the handle 36 is now pivoted to retract the bolt 55, it can be seen that this part of the connecting member 49 is lifted at the kink 59, such that the straight part 57 of member 49 acts to move deadlock element 44 pivotally back to its FIG. 1 position. Accordingly the bolt is no longer prevented from moving inwardly by element 44 and is retracted as the handle is pivoted to its FIG. 5 position.

FIG. 5 shows the position reached when the handle is in its fully pivoted position relative to the casing so that its nose part 52 engages the end wall 14, with the end portion 60 of the connecting member 49 being raised in the groove 54 to its innermost position in the casing where it lies adjacent the inner surface of the closure part 12. From these Figures it will be noted that from the inner side of the body part 45 there is a cylindrical projection 61 with a hemi-spherical head, whilst on the same axis, but at the opposite side there extends an identical but smaller diameter projection 62. This projection 62 is movable through a slot 63 in the side wall 13, and the inner surface of the side wall 13 is formed with a circular section pocket 64 around the slot 63, with a coiled compression spring 65 being received around the projection 62 and having its one end located in said pocket. In this way, the deadlock element 44 is biased to pivot inwardly into the casing, to the position shown in FIG. 3, with the projection 62 acting as an indicator at the exterior of the side wall 13 of the lock to indicate whether or not the bolt 55 is deadlocked. As explained, pivoting of the handle from its FIG. 3 to its FIG. 5 position causes, by way of the intermediary of the connecting member 49 overcoming the force of spring 65, pivoting of the deadlock element 44 to its FIG. 1 position, and accordingly, as will be explained, retraction of the bolt 55. The feature of the connecting member forms the subject of our UK Patent Application No. 0005756.2 from which our co-pending International Patent Application No. 10/009,893 (Our Ref. 37640M) claims priority.

The housing 38 further provides a pair of spaced inwardly directed arms 66 (FIGS. 16 to 18 and 28) and upstanding from the inner surface of the side wall 13 are a pair of spaced parallel guide walls 67 extending normal to the top and bottom walls 16,17, these guide walls 67 lying slightly inwards of the inner surface of the front wall 15, as shown schematically in FIG. 16. Each guide wall is interrupted by a generally rectangular slot 67*a* extending inwards from the outer free edge surface of the guide wall, the two slots being aligned with each other, and also with the opening defined between the two arms 66. Moreover, the front wall of the casing is formed with a rectangular slot 68 which is in the same plane as, and thus aligned with, the aligned slots of the guide walls 67 and the opening between the arms 66. This arrangement is to accommodate a spring loaded bolt release member 69 shown in FIGS. 16 to 18. The member 69 is of elongate form having a tail part 70, which is straight with an upturned end, a coiled compression spring 71 being disposed around the straight section of part 70. The part 70 is arranged to engage in the opening between the arms 66, with one end of the coiled compression spring engaging against the respective sides of the arms facing the front wall 15. The other end of the spring abuts a main body part 72 of the member 69, this being arranged to slide across the guide walls 67 by being received in the slots which interrupt said guide walls as described. At the free end of the body part 72 is a chamfered nose part 73 which is arranged slidingly to extend through the slot 68 as a close sliding fit, as best shown in FIGS. 16 and 18 which represent the fully extended and fully retracted positions respectively of the member 69. Lying between the guide walls 67 on a part cylindrical bearing surface defined between said guide walls 67, is a cylindrical bolt holding member 74 which is arranged automatically to engage with the bolt 55 in its normally fully retracted positions shown in FIGS. 1 and 5. The member 74 is biased by a coil spring 75 received between the top wall 17 and an end of the member 74 to move it away from the wall 17. Along its length, the member 74 is provided with a transverse recess 76 in which is received the main body part 72 of the bolt release member 69. This main body part 72 is of two thicknesses joined by a chamfered surface 77 which, in this embodiment, faces the top wall 17 as shown in FIGS. 17 and 18. The position of this chamfered surface 77 along the length of the bolt release member 69 is such that when the member 69 is in its fully extended position shown in FIG. 16, the thinner portion of the main body part 72 is within the recess 76, adjacent the side of the recess nearest the top wall 17. However, as the member 69 is extended into the casing, the chamfered surface 77 engages the edge of the recess 76 nearest the top wall 17, so that as the linear inwards movement of the bolt release member 69 continues, this chamfered surface forces the member 74 in a direction towards the top wall 17 against the bias of its spring 75. At its opposite end to that at which the spring 75 abuts, the member 74 has a pin 78 adapted to engage in a recess 79 defined in one longitudinal side of the bolt 55.

Accordingly it can now be appreciated from FIGS. 17 and 18 how this pin 78 of the member 74 is spring biased to engage in said recess 79, and thus to hold the bolt in its normally retracted state with the bolt release member 69 spring loaded to its fully extended position. However, as will be described, when the door 10 is closed, the member 69 is automatically forced into the casing against its spring bias, by engagement with the staple at the doorframe, so that, as the member 69 moves to its FIG. 18 position, its chamfered surface 77 moves the member 74 against its spring bias to release the pin 78 from the recess 79 of the bolt 55 which then automatically moves to its extended position under the bias of a coiled compression spring (not shown) which is received in a longitudinal guide 213 which is parallel to and spaced inwardly of the bottom wall 16, this guide extending upwardly from the side wall 13 and extending to the inner surface of the front wall 15. The bolt 55 is provided with a peg extending from its side facing the side wall 13, this peg extending into the guide and thus serving to compress the spring therein when the bolt is moved to its normally fully retracted position and held by member 74, release of the member 74 normally thus allowing this spring to extend in its guide, thereby moving the peg along said guide and causing extension of the bolt A final function provided by the housing 38 is that, in one embodiment, it is extended inwardly of its portion receiving the lock cylinder 39 and associated plug 40 to house a cylindrical component 80 having a radial blocking lug 81 extending from the outer surface thereof. If the housing 38 provides this function, then it receives part of the length of the component 80 within a cylindrical housing part which is provided with an arcuate cut-away portion therein which extends around approximately 100° of arc to allow for movement of the blocking lug 81 between its two extreme positions at opposite ends of said cut-away portion, whilst projecting outwardly from this portion of the housing 38 in which the component can rotate. For clarity, this inwardly extended part of the housing 38 is not shown in FIG. 19, but is shown in FIG. 28, the cut-away being indicated at 181.

The component 80 has the lug 81 extending from its outer surface adjacent one end thereof, this end being the one which is adjacent the inner end of the plug 40 as shown in FIG. 19. The end surface of the plug is recessed inwardly of the end surface of the cylinder, but with a projection 82 extending beyond the end of said cylinder. The end of the component 80 is formed with a reduced diameter part 83 which is sized to fit within the recess defined at the end of the cylinder, so that this end part 83 is received in engagement with the end of the plug. However this end part 83 of component 80 does itself have a recess 84 therein extending over approximately 60° of arc, with the projection 82 being received in said recess, so that when the plug is rotated by operation of a key in the plug 40 at the inside of the door this projection 82 will rotate the component 80 under some circumstances where the projection is in engagement with one of the side surfaces of the recess 84, as will be described. The provision of the recess 84 does however provide for lost motion between the plug and the component 80 so that the plug can be brought back to its position in which the key can be removed from the lock cylinder, whilst leaving the component 80 in its rotated position.

The opposite end of the component 80 has a generally central circular-section bore therein, but within said bore are a pair of diametrically opposed projections 80*a* (FIGS. 32A and 32B) of V-shape, with the respective apices of the two shaped projections being spaced apart but facing one another. The side faces of each projection are flat, and arranged so that the operating bar 28*b* of the plug 28*a* of the assembly 28 is received in this bore in such a manner that key operation of the assembly 28 from the exterior of the door will cause the bar to engage one side of one of the projections on one of its sides and one side of the other projection at its other side so as to turn this component between its opposite extreme positions (FIG. 32B). The annular form and spacing of the projections means that, again, there is lost motion between the locking bar, i.e. the cylinder and plug assembly 28 and the component 80, it being appreciated that in one direction of rotation the bar will engage one flat surface of one projection and one flat surface of the other projection, whilst in the other direction of rotation the bar will engage respective opposite surfaces of said projections to turn the component 80 in the other direction, again the lost motion allowing the plug and cylinder assembly 28 to be moved to a position (FIG. 32A) relative to the component 80 where the key can be removed.

FIGS. 20 to 22 and FIG. 28 show schematically two small angularly spaced apart semi-circular section recesses 85,86 in the interior surface of the extended part of the housing 38 in which part of the component 80 is received, and each recess selectively mates with a small bore 87 in the exterior surface of the component 80 angularly spaced therearound from the lug 81. A small spring is received in said bore 87 and at the end of this is a small ball. In this way the ball is spring biased across the interface between the component 80 and each recess 85,86 as relative rotation takes place between the component 80 and the housing 38. In other words in each of its extreme positions, the component 80 is held substantially firmly in place, against inadvertent rotation, by the spring loaded ball.

FIG. 20 shows that the handle is provided, adjacent its channel 42 with a centrally disposed projection 88 which has a flat surface which faces the closure part 12 when the handle is in its rest position shown in FIG. 19. At its one side, this projection is provided with an upstanding wall 89 which acts as a stop. The position of this projection relative to the component 80 is such that under normal conditions the blocking lug 81 is in the position shown in FIG. 21 or FIG. 22 where it is clear of the projection 88 so that the handle can be pivoted as previously described in relation to FIGS. 4 and 5 to retract the bolt 55. If, however, as briefly described above, the component 80 is moved angularly from its extreme position shown in FIGS. 21 and 22 to its other extreme position shown in FIG. 20, the blocking lug 81 will lie over the flat surface of the projection 88, if the handle is in its rest position, the lug 81 engaging against the stop wall 89 as shown in FIG. 20. In this position pivoting of the handle is prevented by the blocking lug 81. In relation to the handle 36, it is to be noted that a coiled torsion spring (not shown) is received around the pivot rod 41, with one end of the spring engaging against the end wall 14 and the other end engaging against the channel 42 so as to bias the handle to its rest position shown in FIG. 19.

As shown in FIGS. 13 to 15, and also in FIGS. 1 to 5, the bolt 55 is of generally laminar construction being made up generally of a series of interconnected plates all defining a generally rectangular leading end part which extends into and out of the casing through a correspondingly shaped opening 91 in the front wall 15 of the casing. Defined through the centre of the bolt at a position inwards of said leading end part is a slot 92 in which is received the cylindrical projection 61 as shown in FIGS. 1 to 5. Whilst the two innermost and also the two outermost plates 90 defined relative to the side wall 13 terminate at the end of or shortly beyond the end of the leading end part of the bolt, the middle plate, denoted by the numeral 93, is of greater extent from said leading end part and defines two arm portions 94,95 at opposite sides of the slot 92 which is extended to the end of the plate 93 remote from said leading end part. At the free end of the arm portion 94, part of the plate 93 is turned through 90° to form a foot 96 which is directed towards the plate 12. Similarly the free end of the arm portion 95 is also turned through 90° to provide a foot 97 again directed towards the plate 12. As will be appreciated from FIGS. 1 to 5 and 13 to 15, the foot 97 is for engagement by the further nose part 53 to retract the bolt from its extended position, whilst the foot 97 is for engagement by a driving surface 98 of a cam 99 to be described with reference to FIGS. 6 to 12.

FIG. 3 shows that with the bolt fully extended and the handle in its rest position, the further nose part 53 is spaced from the foot 97 of the bolt. This is to allow for the movement of the further part 50 of the connecting member 49 to its FIG. 4 position by the pivoting of the handle, thereby moving the deadlock element 44 clear of the bolt, before the further nose part 53 engages foot 97 to retract the bolt. In this way, retraction of the bolt is unhindered by the element 44. Similarly FIG. 6 shows that the surface 98 of the cam is spaced from the bolt foot 96 when the bolt is fully extended and the cam is in its rest position. This allows initial cam angular movement by a key, as will be described, to move the element 44 clear of the bolt (FIG. 11) before the surface 98 engages the foot 96 to retract the bolt. Thus again retraction of the bolt is unhindered by the element 44.

The arm portion 94 has a hole 100 therethrough adjacent the foot 96, this hole 100 aligning, in a retracted position of the bolt, with one of the holes 12*c* and the holes 13*b* and 38*d* to provide access for a screwdriver shaft to one of the fixing screws 38*h*. In an outer edge of the other arm portion 95 is formed a circular section recess 101 which again, when the bolt is in said retracted position, aligns with the other of the holes 12*c* and the hole 13*c* and cut-away 38*e*, to allow screwdriver access to the other of the fixing screws 38*h*. In this manner with the bolt in a retracted position, and, as previously described, the assembly of lock casing part 11 and plate 12 removed from the door, the respective heads of both of these screws 38*h* holding the rose 110 are then accessible to allow the screws to be undone, in order to allow for removal of the rose, and easy replacement of the lock cylinder 39 and associated plug 40, this aspect of the invention, as mentioned, forming the subject of our UK Patent Application No. 0005753.9 and corresponding International Patent Application No. 10/009,548 (Our Ref. 37637M). It can be arranged that the retracted position of the bolt for access to screws 38*h* is the one when it is held by the member 74 in FIG. 17.

In an outer edge of the arm portion 94 there is provided a cut-out 102 to allow for assembly of the spring which biases the bolt outwardly, into its guide 213. Finally a circular hole 103 is provided in the arm portion 94 adjacent its end thereof nearest the leading end part of the bolt, but clear of the other four plates 90 of the bolt. In conjunction with this hole 103, there is provided in the side wall 13 a circular section through opening 104 which at the inside surface of the side wall is provided through a boss 105. Extending through said opening 104 and into said boss is a snib 106 for retaining the bolt in its normal fully retracted position as shown in FIGS. 13 to 15. The snib 106 has a head 107 which is visible from the exterior of the side wall 13 and which allows the snib to be manually operable from inside of the door to which the lock is fitted, in use. From the head 107, the snib is stepped downwardly twice to define a central reduced diameter part 108 and an end further reduced diameter part 109, all the parts being about a common central axis. A circlip 110 is engaged in a groove of the snib at the junction between the parts 108 and 109, and a coil spring 111 is received around the central part 108, with its one end engaged against an underside of the head 107. The snib is fitted at the opening 104 and boss 105 as shown in FIGS. 13 to 15, so that the other end of the spring is engaged against a step at the inner part of the boss so that the snib is normally biased outwardly to its FIG. 13 position where the circlip 110 acts as a stop against the innermost surface of the boss to hold the snib in place at the casing.

Although the hole 103 is of a size to receive the part 109 of the snib therein, it can be seen from FIG. 13 that in its normal fully retracted state, i.e. with the nose part 52 of the handle 36 in engagement with the end wall 14, this hole 103 is out of alignment with the part 109 of the snib. However it will also be noticed that the foot 97 has itself not yet reached the inner surface of the end wall 14. Accordingly in order to operate the snib, it is first necessary to push the bolt rearwardly from its FIG. 13 position by applying pressure to its leading end part. This moves the foot 97 into engagement with the inner surface of the end wall 14 as shown in FIG. 14, thereby aligning the hole 103 with the part 109 of the snib, allowing the snib to be moved into said hole against its spring bias. Once the part 109 of the snib has been moved into the hole 103, the inwards pressure on the end of the bolt can then be released, and the spring acting on the bolt will move it back to its normal fully retracted position shown in FIG. 15, with the part 109 of the snib retained in the hole 103, which, it will be appreciated, is somewhat oversized in relation to the diameter of the part 109 so as to allow for said movement of the bolt between its FIGS. 14 and 15 positions respectively. It can be seen that, if required, the free end of the part 109 can be provided with a narrow flange to define, with the circlip 110, a neck held in hole 103. Once the snib has engaged the bolt as shown in FIG. 15, release of the snib can only be effected by again applying inwards pressure to the end of the bolt, thereby releasing engagement of the bolt at the edge of the hole 103 on the part 109. The spring 111 then automatically moves the released snib back to its FIG. 13 position and the greater projection of the head 107 at the outside of the side wall 13 indicates that the snib is no longer engaged, so that in closing the door, the bolt will automatically extend as described herein above. Although as described and shown, the snib holds the bolt in its FIG. 17 retracted position, the snib could alternatively be arranged to hold the bolt in a position between the positions of the bolt in FIGS. 13 and 15 respectively. Accordingly the hole 100 and recess 101 would be re-positioned to allow access to screws 38*h*, although with posi-drive screw heads a screwdriver shank at an angle thereto might still be able to undo the screws. The feature of the snib to lock the retracted bolt against release on closing the door, forms the subject of our UK Patent Application No. 0005754.7 from which our co-pending International Patent Application No. 10/009,549 (Our Ref. 37638M) claims priority.

Finally with regard to the components of the lock, reference is made to FIGS. 6 to 12 which show the cam 99, the driving surface 98 of which, as mentioned previously, acts, in operation, on the foot 96 to retract the bolt 55. As will be described, the handle operates, in use, from the inside of the door to retract the bolt by way of the further nose part 53 acting on the foot 97, whereas from the outside of the door key operation at the cylinder and plug assembly 28 moves this cam 99 and thus retracts the bolt by way of the driving surface 98 engaging the foot 96. In its rest position, shown in FIGS. 6, 8 and 9, a side surface thereof engages a stop 99*a* in the form of a lug or equivalent projecting inwardly from closure part 12 to prevent anticlockwise movement of the cam (as viewed in FIG. 6) from its rest position.

The cam 99 is provided on its one side with a hollow boss 112 (FIG. 19A) which is rotatably received on the end of the component 80 which has therein the bore containing said V-shaped projections. At the other side of the cam is an upstanding boss 113 which has the same centre as the boss 112. A slot 114 for a locking bar of the cylinder and plug assembly 28 extends through the boss 113 and into the interior of the hollow boss 112, rotation of the locking bar being effected upon key rotation of the plug of the lock cylinder and plug assembly 28 to rotate the component 80 as described, with there being lost motion between the cam 99 and the component 80. As shown in FIGS. 6 to 12, the surface of the cam at the side at which the boss 112 is provided is formed from an edge surface 115 disposed at approximately 90° around the cam from the surface 98, with a first flat surface 116 and a second longer flat surface 117, these two flat surfaces being joined by a ramp section 118. FIGS. 6 and 7 show the arrangement where the bolt 55 is fully extended and deadlocked in this position by the nose 46 engaging the inner end of the plate 90 immediately adjacent the middle plate 93 at the side thereof facing the side wall 13. As shown in FIGS. 1 to 5 and 13 to 15, this plate which is in engagement with the middle plate 93, extends further inward than the outer plate of this side of the bolt which faces the side wall 13 so that, as shown in FIG. 2, the nose 46 will also deadlock the bolt in its partly extended position, the nose then engaging the inner end of said outermost plate at this side of the bolt.

Accordingly as shown in FIG. 7, corresponding to the arrangement of FIG. 3, the bolt is held in its fully extended position with the hemispherical head of the projection 61 being in juxtaposition with the flat surface 116. If key operation of the lock is now effected from the exterior of the door, the cam 99 will rotate as described and retract the bolt. FIG. 8 shows the position where the bolt is fully retracted and held in this position by the member 74, the cam being returned by key rotation to its position shown in FIG. 8, FIG. 9 showing how the hemispherical head of the projection 61 is now spaced clear of the flat surface 116 as the deadlock element is now in its FIG. 1 position. FIG. 11 shows how the projection 61 is depressed as the cam rotates, with the head of the projection 61 being forced against its spring bias as its head engages the ramp section 118, this movement against its spring releasing the deadlocking of the bolt which can then be retracted by virtue of the driving surface 98 of the cam 99 engaging the arm portion 96 of the bolt. FIG. 12 shows the relative positions of the cam and the deadlock element in the position where the cam engages the arm portion 96 before the cam is moved by key rotation to return to its FIG. 8 position. With the bolt held fully retracted, key rotation will return the cam from its dashed FIG. 10 position of engagement with foot 98 back to its FIG. 1 position, where the cam engages its stop 99*a*.

Operation of the lock, in use, will now be described.

With the lock fitted to the door 10 as shown in FIG. 23, the lock cylinder and plug assembly 28 is operable by a key from the outside of the door, the lock cylinder 39 and associated plug 40 of FIG. 19 being operable from the inside of the door by use of the same key. Conveniently each plug and cylinder assembly, and the key, may be of the form described and claimed in our pending published European Patent Application No. 0892130.

Normally, with the door 10 closed, i.e. received in its associated frame, the bolt 55 is in its fully extended position, for example as shown in FIG. 3, the leading end part of the bolt projecting from the front wall 15 being received in an associated keeper of any conventional form secured at or to the frame. In this state, the deadlock element 44 is in the position shown in FIG. 3 where it deadlocks the bolt 55, as described, by acting as an abutment with the plate 90 of the bolt attached to the outer side of the plate 93. In this deadlocked state, the projection 62 is fully received in the case, and this provides a visual indication at the inside of the door that the deadlocking is in operation. Moreover in this state, the handle 36 is in its rest position as shown in FIG. 3, the cam 99 is in its rest position as shown in FIG. 6, the snib 106 is in its rest position shown in FIG. 13, and the bolt release member 69 is in its retracted position shown in FIG. 18, being held against its spring bias by the engagement of the nose part 73 with the surface of the staple. As can be seen from FIG. 18, with the bolt release member in this position, the bolt holding member 74 is held by it clear of the adjacent side surface of the bolt.

In this deadlocked state, the door can be opened from the exterior by the use of the key for the lock in the assembly 28. If the key is inserted into the plug of the assembly 28 and turned clockwise, as viewed in FIG. 20, the locking bar of the assembly 28 received in the slot 114 in the cam 99 will cause the cam to move angularly in a clockwise direction as viewed in FIGS. 6 to 10. Firstly the driving surface 98 of the cam will move towards the foot 96, and at the same time the ramp section 118 of the cam will engage the head of the projection 61 so as to begin moving it to release the deadlocking on the bolt, so that when the surface 98 engages the foot 96, it can begin to retract the bolt into the casing as the projection 61 has now been engaged by the second longer flat surface 117 of the cam, as shown in FIG. 11, with the deadlock element 44 now being clear of the outer plate 90 of the bolt, as shown in FIG. 11. The cam is then moved angularly by the locking bar until the bolt is in its normally fully retracted state, shown in dashed in FIG. 10, and as shown in FIG. 12 with the cam moved angularly to its extreme position.

In this state, however, unless the door is now opened, the bolt is not held retracted, given that the bolt release member 69 is still in its FIG. 18 position, preventing the bolt holding member 74 engaging the retracted bolt. Accordingly once the bolt is fully retracted, it is necessary to open the door, whereupon the bolt release member 69 is released from its engagement with the frame and, under its spring bias, slides to its FIG. 17 position where its nose part 73 extends from the front face of the lock. This sliding allows the bolt holding member 74 to move under its spring bias, to its FIG. 17 position where its pin 78 engages in the recess 79 in the side of the bolt, thereby holding the bolt in its retracted state. The key, and thus the plug of the assembly 28 can now be returned to its rest/key insertion position and the key removed. This return movement of the key brings the cam 99 from its one extreme position, shown in FIG. 12 and in dashed in FIG. 10, to its other extreme or rest position shown in FIG. 8, with the bolt retracted, the deadlock element 44 being in the position shown in FIG. 1 merely in engagement with one side of the bolt, with its projection 62 projecting from the exterior surface of side wall 13 to indicate that the bolt is not deadlocked.

Once at the inside of the door, a user can then close the door, which action automatically 'throws' the bolt, thereby locking the door. This is accomplished merely by closing the door from the inside, since this will cause engagement of the nose part 73 of the bolt release member 69 with the staple, thereby forcing this member 69 into the lock casing from its FIG. 17 position to its FIG. 18 position, this resulting in withdrawal of the bolt holding member 74. As a consequence the bolt is automatically extended under the force of its biasing spring so that it is shot out of the casing to its FIG. 3 position, with the deadlock element 44 operating automatically as shown in FIGS. 1 to 3 again to deadlock the bolt.

Thereafter to open the door from the inside, it is merely necessary to pivot the lever 36 at the inside of the door from its rest position shown in FIGS. 1 to 3 to its fully pivoted position shown in FIG. 5. This pivoting of the lever is transmitted via the connecting member 49 to the deadlock element 44 so as to move this firstly to its FIG. 4 position, where it no longer deadlocks the bolt, and then to its FIG. 5 position where the bolt is fully retracted into the casing by virtue of the further nose part 53 of the handle engaging the foot 97 of plate 93 of the bolt as shown in FIGS. 4 and 5, this retraction of the bolt taking place against its biasing spring, with pivoting of the handle also taking place against its own biasing spring. Once the FIG. 5 position is reached, it is again necessary to open the door in order to retain the bolt in its retracted position by means of the bolt holding member 74. Accordingly, as previously described in order to hold the bolt retracted when entering from outside, opening of the door from the inside by way of the handle will again cause the bolt release member 69 to extend out of the casing, thereby releasing the bolt holding member 74 which moves under its spring bias to engage in the recess 79 in the bolt to hold it retracted. Thereafter closing the door causes the nose part 73 of the bolt release member 69 to engage the frame and be pushed inwardly, so as to move the bolt holding member 74 from its engagement with the bolt, which is thus then automatically extended out of the casing under its biasing force, so that the closed door is again automatically locked by the bolt entering into its associated keeper, the movement of the bolt from its extended to its retracted position, as shown in FIGS. 1 to 3, also allowing the deadlock element to move as shown in sequence through FIGS. 1 to 3 so as again to deadlock the extended bolt in its keeper, thereby locking the door. It will be noted from FIG. 2 that due to the different lengths of the two bolt plates 90 at the side of the plate 93 facing the side wall 13, the bolt is deadlocked not only in its fully extended position shown in FIG. 3, but also in its partly extended position shown in FIG. 2 where the nose 46 of the deadlock element 44 engages the shorter outermost plate 93 of said two plates at said one side of the middle plate 93. This feature ensures a secondary locking position to provide security should the bolt not fully extend for any reason.

A feature of the lock relates to the locking of the handle 36 so that it cannot be operated from the inside of the door without the key for the lock, thereby preventing an intruder exiting through the door. This forms the subject of our UK Patent Application No. 0005752.1 from which our co-pending International Patent Application No. 10/009,435 (Our Ref: 37636M) claims priority. This feature is of particular benefit when the lock is used on glass panel doors.

To lock the door from the inside, the handle is firstly pivoted and the door opened, to hold the bolt in its retracted position. The key is then inserted into the plug 40 in its lock cylinder 39 in the housing 38. In this key insertion state, the projection 82 of the plug is against one surface of the recess 84 of the cylindrical component 80 as shown in FIG. 22, with the lug 81 of component 80 clear of the projection 88 of the handle, so that in this state the handle can still be pivoted. If the key is now turned in an anti-clockwise direction, as viewed in FIG. 22, the plug turns, and thus the projection 82 of the plug acts on the component 80 to turn it also in an anti-clockwise direction to bring the lug 81 over the projection 88 and into engagement with the wall 89, as shown in FIG. 20. During this angular movement of the component 80, the spring loaded ball associated with the component 80 moves from partial reception in the recess 86 to partial reception in the recess 85 thereby holding the component 80 in its FIG. 20 position. To remove the key, it is then rotated back to its insertion position, and the lost motion between the plug and the component 80 allows the plug to rotate relative thereto, thereby bringing its projection 82 back to its original key insertion state, as shown in FIG. 20. The key is then removed and the door closed on exit in the normal manner thereby automatically deadlocking the closed door as previously described. Pivoting of the handle is now prevented by the blocking lug 81.

To open the door from the outside, the key is inserted in the plug of the assembly 28 and turned in a clockwise direction as viewed in FIG. 20, the locking bar 28*b* of this assembly 28 engaging through the cam slot 114 extending into said bore of the component 80 having said V-shaped projections 80*a* therein. With the cam 99 in its FIG. 6 position, the disposition of the slot 114 relative to said V-shaped projections in the bore in one end of the component 80 is such that when the key is turned there is initial take-up of lost motion between the bar and respective engagement sides of the V-shaped projections, this lost motion corresponding to the movement of the driving surface 98 into engagement with the foot 96. Once this lost motion has been taken up and the cam is at the position shown in full in FIG. 10, continued turning of the key effects turning of the locking bar 28*b*, which, by virtue of its engagement with respective surfaces of the V-shaped projections 80*a* causes the component 80 to rotate from its FIGS. 20 and 32B positions to its FIGS. 22 and 32A positions where the lug 81 is clear of the projection 88 on the handle. This is an important safety aspect of the re-entry procedure in that it releases the locking of the handle which was effected upon original egress. As a result, once the door is thereafter closed, it can (immediately) be re-opened from the inside by pivoting the handle. The described key rotation also effects angular movement of the cam to retract the bolt as shown in FIG. 10 in phantom. Again as the component 80 moves from its FIG. 20 to its FIG. 22 position, the spring loaded ball partly received in bore 87 moves out of partial engagement in recess 85 to partial engagement in recess 86 to hold the component 80 in its FIG. 22 position. Thereafter the key is turned back to its insertion position (FIG. 32B), resulting in the locking bar also moving relative to the component 80 due to the lost motion provided, so that the key can then be removed from the plug of the assembly 28 once the door has been opened and the bolt again held in its retracted position. The handle is now again operable when required to effect retraction of the bolt. It will be appreciated that with the handle blocked against angular movement, access to the fixing screw 27 for the screwdriver shank 27*a* through the cut-out in the end of the handle is prevented, and thus removal of the assembly of casing part 11 and plate 12 is prevented.

Finally with regard to operation of the lock, reference is made to the use of the snib 106 as shown in FIGS. 13 to 15.

As previously described, operation of the handle 36 or the cam 99 to retract the bolt 55 will bring it to the positions shown in FIGS. 13 and 15 respectively where the foot 97 of the plate 93 of the bolt is spaced from the interior surface of the end wall 14. In this position, as shown in FIG. 13, the spring loaded snib 106 is out of alignment with the hole 103 in said plate 93, and thus cannot be operated to retain the bolt in its retracted position irrespective of the state of the bolt release member 69. However if the bolt is pushed inwardly from its leading end at the outer edge surface of the door, it can be moved to its FIG. 14 position where the clearance between the foot 96 and the wall 14 is taken up so that the foot now abuts the interior surface of said wall. In this position the hole 103 has now become aligned with the snib, which can thus be pressed inwardly against its spring bias so that its end part 109 is received through said opening, removal of the inwards force on the bolt resulting in the bolt automatically being moved by its spring force in a direction to extend from the casing. However although the bolt can move by said amount of clearance away from the wall 14, further movement is stopped by the engagement of an edge of the hole 103 engaging the part 109 of the snib, as shown in FIG. 15, so that the snib is held thereby to retain the bolt in its normally retracted position The door can thus now be open and closed without the bolt automatically shooting or needing to be withdrawn.

With conventional snib locking arrangements of this type, for example where the snib is slid between engagement and non-engagement positions respectively to hold the bolt, it is possible for the snib inadvertently to be disengaged and thus allow inadvertent shooting of the bolt and resultant inadvertent locking of the door. In contrast, with the present arrangement, inadvertent release of the snib is very unlikely in that specific positive action is needed at the front edge surface of the door, namely the application of pressure to the end of the bolt to force it inwardly to an extent where the hole 103 is again fully aligned with the snib which then would automatically release under its spring bias, the bolt then automatically moving to its normal retracted position. As mentioned, the snib could be arranged with the bolt, so that the bolt is held by the snib slightly inwards of its FIGS. 13 and 15 position, but slightly outwards of its FIG. 14 position.

Finally in relation to consideration of pressure being applied to the end of the bolt, it will be noted that any attempt forcibly to retract the bolt from its FIG. 3 position, for example by inserting an implement between the end of the bolt and its keeper, would result in a force being applied to the deadlock element 44. With some lock arrangements, the application of such a force to the deadlock might cause it to release from the bolt which can then be forced inwardly to unlock the door. However with the present arrangement the housing 38, as described, provides the upper half of the bearing for the rod 43 of the deadlock element. Additionally, however, this housing provides a solid wall 238 immediately adjacent the side of the rod remote from the body part 45 of the element 44. Since the housing 38 is secured to the casing by fixing screws, any inward force applied to the bolt in its FIG. 3 position and received by the deadlock element 44 will be taken by said adjacent solid wall of the housing 38, and since this is securely fixed to the casing, there is resistance to disengagement of the deadlock member from its engagement with the bolt, thereby making the bolt more secure against such attack.

Although in the embodiment of the lock described, blocking of the handle can only be actuated from inside of the door, in an alternative embodiment means could be provided within the lock casing to allow for blocking of the handle to be actuatable from outside of the door, in addition to, or instead of, from the inside of the door. Such means could be the same as or different from the means used inside the door, and moreover whilst it would be convenient for any means operable from outside of the door to be operated by the key, so that for example the key could be used both to engage and retract the blocking member, this may not necessarily be the case, so that something other than key operation could be provided at the outside of the door to cause said blocking, and similarly something other than key operation could be provided at the inside to cause said blocking. However most preferably, the blocking would be actuatable from both inside and outside the door, preferably in both cases by means of the key of the lock.

It will be appreciated that with a different form of handle, e.g. a flat plate, the provision of a cut-out therein may be unnecessary to allow screwdriver access to screw 27 when the handle is fully pivoted.

In another embodiment means other than the outside key operation which deactivates the blocking means, such as an outer handle, could be used to retract the bolt.

What is claimed is:

1. A lock for a wing movable between respective open and closed positions relative to a frame, the lock comprising a casing having an open end and an integral flange adapted to be received, in use, in a rebate in an edge surface of the wing and securable thereto by fixing means received through said flange, a bolt operable to extend from or to retract into said casing, an operating handle pivotally mounted to the casing at one side of the wing for movement from a rest position, to which it is biased, to an operated position normally to effect retraction of said bolt, a casing interior portion with an aperture therethrough to receive fixing means, a closure plate within the casing, spaced from said open end thereof and being secured to the casing solely by respective fixing means passing through said plate to engage with respective fixing members in the casing, a mounting plate for mounting to the wing, in use, the casing with its closure plate secured thereto, the mounting plate being disposed, in use, outwardly of said closure plate, at said open end of the casing with at least one tag of the mounting plate extending through said closure plate and being secured to said casing by fixing means extending through the at least one tag, the casing being further secured to the wing, in use, by fixing means passing through said aperture and said mounting plate into said wing, access for an implement to fasten or release said fixing means being through an opening in said casing, which opening is blocked by the operating handle, thereby to prevent such access, when the operating handle is in its rest position, such access being possible only when the operating handle is in its operated position, such access being through an opening in the pivotal operating handle.

2. A lock as claimed in claim 1, wherein locking means are operable from said one side of the wing to prevent operation of the operating member from its rest position.

3. A lock as claimed in claim 1, wherein the casing interior portion is a lug on an inner wall of the casing.

4. A lock as claimed in claim 3, wherein said aperture is a plain circular bore through the lug.

5. A lock as claimed in claim 1 wherein the fixing means passing through said aperture is a screw engaged in a tapped hole in said mounting plate.

6. A lock as claimed in claim 5, wherein, in use, the end of said screw extending from said tapped hole is received in a recess in said one side of the wing.

7. A lock as claimed in claim 1, wherein the mounting plate carries lock means extending through the wing, in use, and operable at said other side of the wing.

* * * * *